Figure 8:
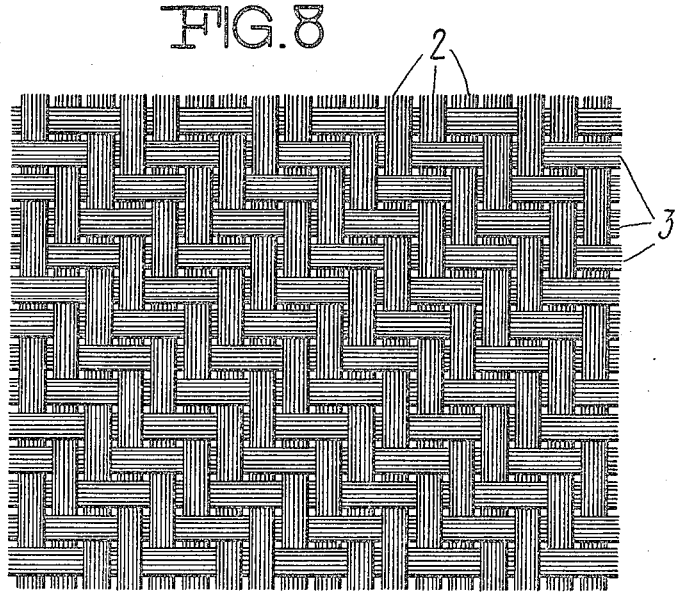

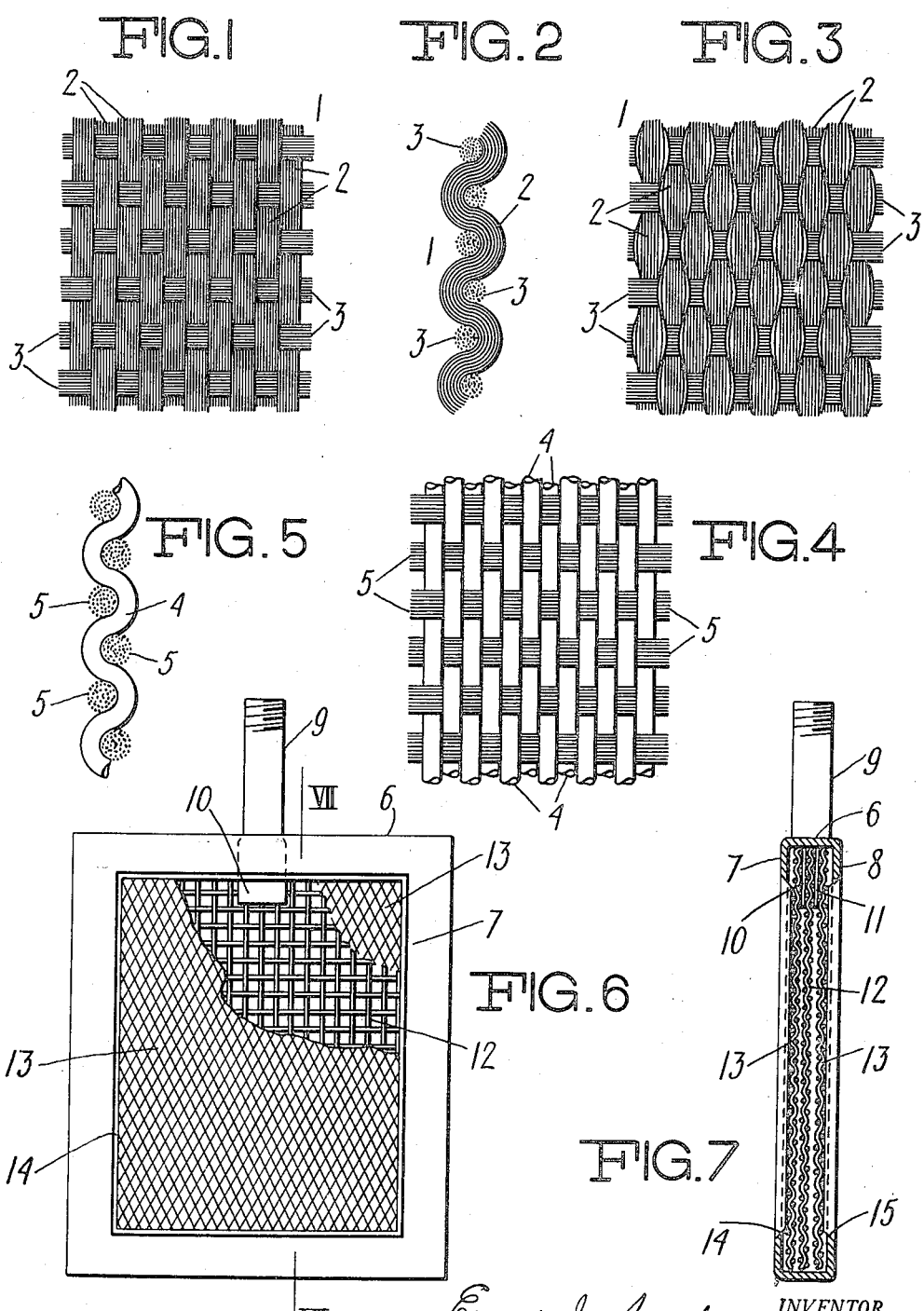

E. J. SWEETLAND.
FILTER MEDIUM OR OTHER ARTICLE OF MANUFACTURE.
APPLICATION FILED JUNE 9, 1915.

1,304,918.

Patented May 27, 1919.

Ernest J. Sweetland INVENTOR.
BY
G. E. Terwilliger ATTORNEY

UNITED STATES PATENT OFFICE.

ERNEST J. SWEETLAND, OF MONTCLAIR, NEW JERSEY.

FILTER MEDIUM OR OTHER ARTICLE OF MANUFACTURE.

1,304,918.             Specification of Letters Patent.      Patented May 27, 1919.

Original application filed May 25, 1914, Serial No. 840,731. Divided and this application filed June 9, 1915.
Serial No. 33,156.

*To all whom it may concern:*

Be it known that I, ERNEST J. SWEETLAND, a citizen of the United States, residing in the town of Montclair, county of Essex, and State of New Jersey, have invented certain new and useful Improvements in Filter Mediums or other Articles of Manufacture, of which the following is a specification.

My invention relates particularly to a filter medium comprising a woven fabric of fine metallic wires. Hitherto the filter medium most used has been cloth, and for many purposes this is entirely satisfactory. However, when the substance to be filtered contains an agent which is destructive of cloth, such, for instance, as strong alkalis, the cloth filter medium is rapidly destroyed. To replace the destroyed cloth represents not only a considerable expenditure of time and financial loss, due to the period during which the filter is thrown out of service, but also a large expense for new cloth. The chief object of my present invention is to provide a filter medium which may be used to replace cloth and which will be composed of material that is not attacked by the agents which destroy the cloth, but I realize that my improved fabric may be advantageously used for a number of other purposes in the arts so that, except as specifically set forth, I do not desire to limit the claims to a filter fabric. For instance, when water is forced through the fabric under pressure, it is broken up into a fine spray having characteristics different from those of any spray of which I am aware. The fabric permits a relatively large volume of water, or other fluid, to pass through it, but at the same time breaks it up into an exceedingly fine spray which is useful in watering vegetation, in shower baths and in many other situations, as will be obvious. This is only one additional use for my improved fabric, and I do not deem it necessary to set forth others in detail. This application is a division of my co-pending application No. 840,731 filed May 25, 1914.

In my improved filter structure I provide a filter medium which is composed of interwoven metallic wires, which are preferably of an exceedingly small diameter. I am aware that in the filtration of certain substances, the use of fine wire netting or screen has hitherto been proposed, but such netting or screen acts as a strainer rather than as a true filter medium, whereas my improved fabric will filter a slimy sludge and obtain therefrom a filtrate which is crystal clear. Furthermore, these fine wire screens previously used are so delicate in their texture that their commercial use is practically prohibited under normal conditions of operation and their expense is comparatively great. On the other hand my improved filter fabric is rugged in its texture and its cost is not exorbitant. Another great advantage of my improved fabric over ordinary screen is the resistance which it offers to the passage of air through it. This is of importance in filtration, since it is common to dislodge the filter cake from the filter medium by introducing compressed air into the filter leaf. If the filter medium is wire screen, a small piece of the filter cake will break away first and the compressed air will rush out through the opening thus formed in the cake, so that the remainder of the cake is not dislodged. My improved fabric offers such a resistance to the passage of the air that the breaking away of a small piece of the cake in the manner above described will not release the air pressure to any considerable extent and the remainder of the cake will, therefore, be entirely dislodged.

Figure 9:
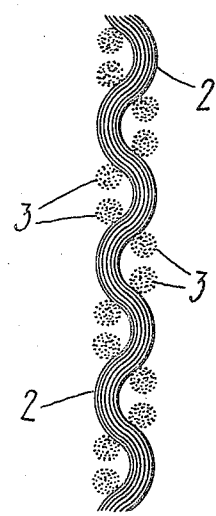
Figure 10:
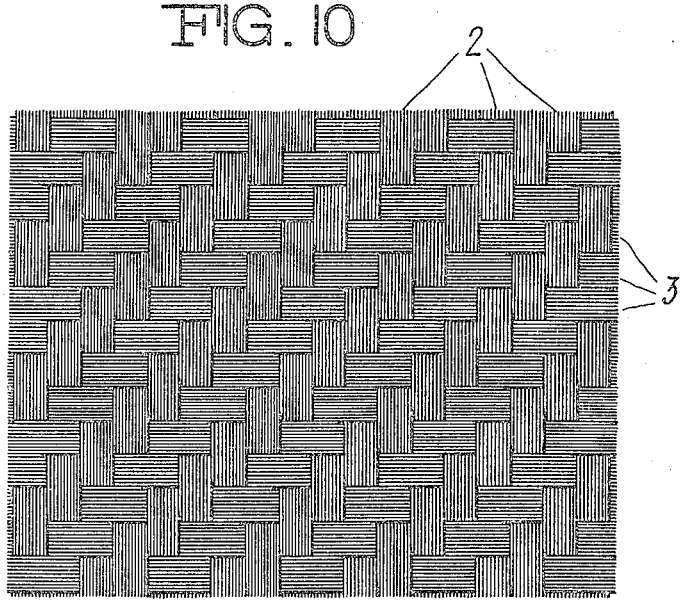
Figure 11:
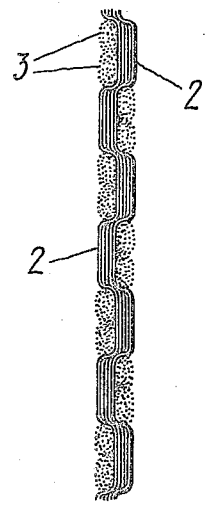

In the accompanying drawings which form a part of this specification, Figure 1 is a plan view of one form of my improved fabric; Fig. 2 is a transverse sectional view of the structure of Fig. 1; Fig. 3 is a plan view of the structure of Fig. 1 after it has been flattened under pressure, as by rolling; Fig. 4 is a view similar to Fig. 1 showing a modified form of construction; Fig. 5 is a transverse sectional view of the structure of Fig. 4; Fig. 6 is an elevation of a filter leaf in which my improved fabric is utilized; Fig. 7 is a transverse sectional view on line VII—VII of Fig. 6; Fig. 8 is a diagrammatic view similar to Fig. 1, but showing a twill fabric; Fig. 9 is a diagrammatic sectional view of the structure of Fig. 8; Fig. 10 is a diagrammatic view similar to Fig. 3 showing the twill fabric after it has been rolled; Fig. 11 is a diagrammatic sectional view of Fig. 10.

Referring to the drawings in detail, the numeral 1 designates a filter fabric composed of interwoven warp threads 2 and weft threads 3, each of which threads comprises a plurality or bundle of fine wires.

Each bundle of wires may be formed into a strand prior to weaving by twisting, or the wires may be conveniently aggregated while lying parallel to each other by the use of soap, wax, or other adhesive, which will cause the wires composing a bundle to cling together during the process of weaving, but which may be eliminated after the weaving of the filter structure is completed. In using the word "bundle" in this specification, I intend it to be considered simply as a convenient term for describing a plurality of wires forming a strand, and do not desire to limit it to a structure in which the wires are secured to each other, either by twisting or in any other way, such as the use of soap, wax or other adhesive.

As an example of the dimensions which are found convenient for certain filtration purposes, but without limiting myself in any way to their specific use, I may state that a filter medium may be advantageously woven in which each warp and weft thread is composed of sixty (60) strands of wire 0.003 of an inch in diameter. When these strands are closely interwoven a fabric will be formed which has nearly one million interstices to the square inch. The finest screen or netting of which I am aware is manufactured with about 200 wires each way to the inch, thus giving about 40,000 interstices. It will thus be seen that in addition to certain other advantages, the fabric as described above has 25 times as many interstices per unit of area. Wires of this general nature may conveniently be termed "filamental wires" and this term for convenience is used in this specification and claims. In some instances such an extremely fine fabric is not needed, and by way of example it may be stated that I have found a filter cloth composed of bundles containing five wires each to be satisfactory for many purposes.

After the fabric is woven I find that it is extremely advantageous to subject it to pressure, in order to flatten out the strands and cause a more homogeneous texture. The general appearance of the fabric subsequent to flattening, which is best attained by rolling between pressure rolls, the distance between which may be adjusted with great precision, is shown in Fig. 3 of the drawings. A very great advantage which inheres in the process of rolling is the fact that such rolling gives to the fabric a smooth glass-like surface to which the filter cake will not strongly adhere. The filter cake may, therefore, be readily released from the surface of the filter fabric either by "reversing the flow" in the manner fully described in my United States Patent No. 1,083,305, dated January 6, 1914, or in any other of the ways well known in the art of filtration.

In place of constructing both the warp and the weft threads of a plurality or bundle of wires, I find that a very satisfactory filter fabric may be obtained by making one set of threads, as for instance, the warp threads, single wires of a diameter which will approximate the diameter of the bundle of aggregated wires used for the other set of threads. This construction is illustrated in Fig. 4, in which the numeral 4 designates the warp threads composed of single wires which are interwoven with the weft threads 5 composed of bundles of wires, as above. After weaving of this fabric it is preferably subjected to the same operation of rolling or other compression to aggregate its individual elements more homogeneously.

In Figs. 6 and 7 I have shown a filter leaf composed of an outer frame 6 of channel section having inwardly inturned legs 7 and 8. A nipple 9 is inserted in the frame at one point and has at its inner end split to form the legs 10 and 11, which straddle a drainage member 12, which may preferably be constructed of coarse screen. On either side of the member 12 is a layer 13 of my improved filter fabric constructed in either of the ways already described. The edges of these layers are retained between the legs 7 and 8 of the channel frame, and sealing lips 14 and 15 may be provided at the edge of each leg for preventing the passage of the liquid to be filtered between the edge of the leg and the edge of the filter medium.

Such a filter leaf as I have above described may be applied to the type of filter shown and described in detail in my United States Patent No. 1,083,305, dated January 6, 1914. The course of the filtrate, as will be obvious, will be through the filter fabric 13, thence through the space formed between the two layers of fabric by the coarse screen 12. The clear filtrate passes out through the nipple 9 to the outlet manifold, which is not shown. The application of my improved fabric to the type of filter-leaf shown in Figs. 6 and 7 is of course merely by way of illustration and I appreciate that the fabric may in many instances be advantageously used to replace existing filter media in other well-known types of filters.

While I have shown in Figs. 1 to 5 of the drawings the so-called "basket-weave," it is obvious that the other forms of weaving may be advantageously employed, such for instance, as that forming a twill fabric. In Figs. 8, 9, 10 and 11 I have illustrated in a diagrammatic way, the application of my invention to a twill fabric which for certain purposes has the advantage of forming a tighter or closer weave than is obtained by the so-called "basket-weave."

It will be appreciated that the structure, particularly of Figs. 8 and 9, is diagrammatic and on a greatly enlarged scale. In actual construction the parts are so tightly woven that the interstices appearing in Figs.

8 and 9 between adjacent strands are to a great extent done away with even before the fabric is rolled.

I have shown in Figs. 8 to 11, inclusive, what is known as a "two leaf twill," but it will be obvious that other forms of well known twill fabrics may be employed. Furthermore, I have illustrated and described only certain specific embodiments of my invention, but I realize that it is susceptible of wide application and I do not desire to be limited to the precise construction set forth.

Having thus described my invention, I claim:

1. The process of forming a filter medium, which consists in aggregating into bundles a plurality of metallic wires and weaving the bundles into a closely-woven fabric and then subjecting the fabric so woven to pressure in order to decrease the sizes of its interstices.

2. The process of forming a filter medium, which consists in aggregating into bundles a plurality of filamental metallic wires and weaving the bundles into a closely-woven fabric and then subjecting the fabric so woven to pressure by a rolling action in order to decrease the sizes of its interstices.

3. The process of forming a filter medium, which consists in aggregating a plurality of filamental metallic wires to form bundles, then taking a plurality of single wires and weaving all into a closely woven fabric and then subjecting the fabric so woven to pressure in order to decrease the sizes of its interstices.

ERNEST J. SWEETLAND.

Witness:
W. R. WARNER.